E. ROSCOE.
STATION INDICATOR.
APPLICATION FILED DEC. 11, 1916.

1,315,336.

Patented Sept. 9, 1919.
2 SHEETS—SHEET 1.

E. Roscoe.
Inventor.
By Albert E. Parker
Attorney.

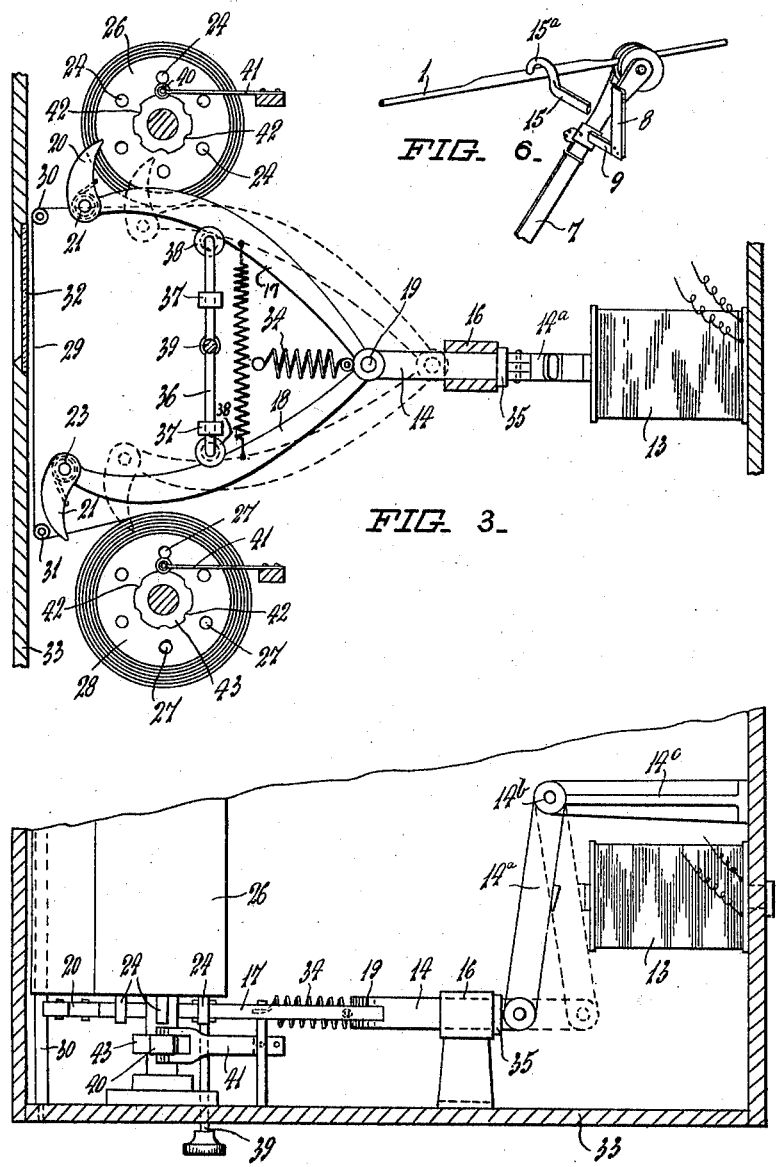

UNITED STATES PATENT OFFICE.

EDWARD ROSCOE, OF HAMILTON, NEW ZEALAND.

STATION-INDICATOR.

1,315,336.  Specification of Letters Patent.  Patented Sept. 9, 1919.

Application filed December 11, 1916. Serial No. 136,121.

*To all whom it may concern:*

Be it known that I, EDWARD ROSCOE, a citizen of the Dominion of New Zealand, and residing at Hamilton, in the Provincial District of Auckland, in the Dominion of New Zealand, gentleman, have invented a certain new and useful Station-Indicator, of which the following is a specification.

This invention relates to apparatus for indicating successively the stopping places along the route of a tramway or the like, so that passengers may see the name of the next stopping place or station, in which mechanism operated by electric current is taken as required from an over head or other electric trolley wire.

The object of my invention is to provide a station indicator in which the belt carrying the names of the stations or streets may be caused to move in either direction by a single magnet, at predetermined times and operated by the current taken from the trolley wire and so arranged that the direction of movement of the belt may be reversed so as to properly indicate the stations or streets on the return travel of the car over the route.

Another object of my invention is to provide a simple cheap and effective station indicator having certain details of structure and combination of parts hereinafter more fully described.

The drawing herewith illustrates the invention and will now be referred to for the purposes of a detailed description.

Fig. 3, is an end elevation partly in section, and

Figure 5:
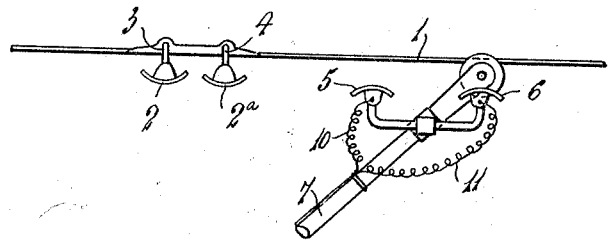

Fig. 4, a plan of the indicator mechanism,

Fig. 5, is a side elevation showing contact wipers of the trolley wire and trolley pole, Fig. 6, is a perspective elevation of a modified form of contact wipers.

Figure 1:
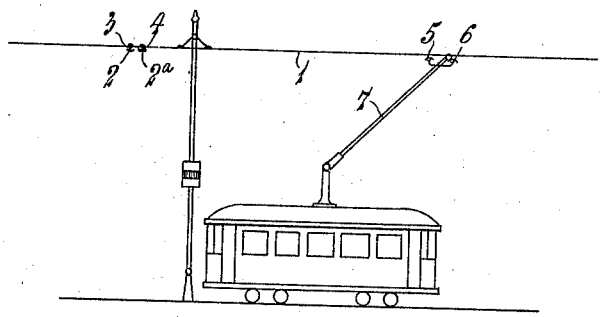
Figure 1, is a diagrammatic elevation of the apparatus.
Figure 2:
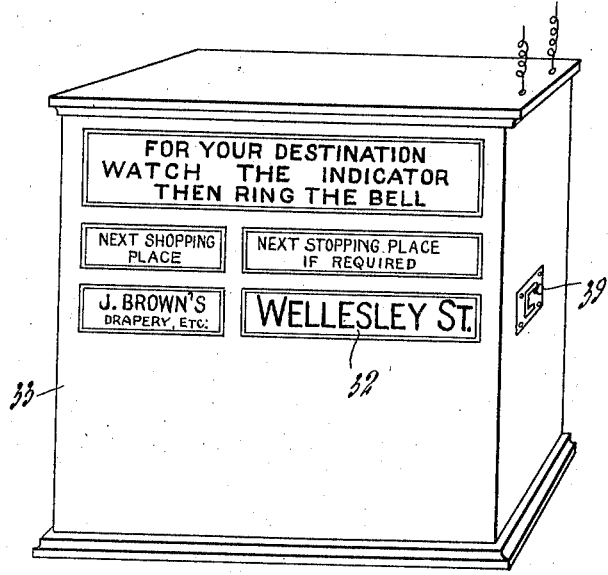
Fig. 2, is a perspective view of the indicator cabinet.

The trolley wire 1 is provided with wipers, as shown in Figs. 1 and 5, which consist of curved plates or springs 2 and $2^a$ connected to the wire 1 by arms 3 and 4 respectively. Corresponding wipers 5 and 6 are connected to the trolley pole 7. The wipers are attached to the trolley wire immediately behind each stopping place of a route.

Fig. 6 shows the trolley pole 7 provided with a metal spring wiper 8 attached by an arm 9, and a wiper comprising a flat plate 15 attached to the trolley wire by an arm $15^a$.

Wires 10 and 11 load from the wipers 5 and 6 to an electromagnet 13 and a rod 14 slidable in a bracket 16 is adapted to be attracted by the magnet through the medium of a lever $14^a$ pivoted by a pin $14^b$ to a bracket $14^c$. The rod 14 is attached to arms 17 and 18 by a stop joint 19 having a spring tending to close the arms together, the stops of the joints preventing the arms from spreading more than is required. Pawls 20 and 21 are attached respectively to the arms 17 and 18 by stop joints 22 and 23 having springs which normally keep the said pawls in the positions shown in Fig. 3, but which allow the pawls to close upon the arms, as shown by dotted lines in Fig. 3.

The pawl 20 is adapted to engage pins 24 projecting from the end of an upper roller 26, and the pawl 21 is adapted to engage pins 27 projecting from the end of a lower roller 28. A canvas band 29 connected at its ends to the rollers 26 and 28, is guided by rollers 30 and 31 close to the inner surface of a glass panel or window 32 of a cabinet 33, the surfaces of which are used for displaying advertisements. The stopping places of a route are inscribed in their proper order upon the band 29 and are visible to passengers of a vehicle through the panel 32.

After the magnet 13 is deënergized, the rod 14 is withdrawn and restored to its normal position by a spring 34 in tension, the withdrawal of the rod being limited by a stop 35.

A sliding switch 36, consisting of a rod slidable in brackets 37 and furnished at its ends with friction rollers 38, is operable by a lever 39 located within convenient reach of the conductor of the vehicle, for the purpose of throwing either the arm 17 and its pawl 20 in or out of gear with pins 24, and the arm 18 and the pawl 21 out of or in gear with the pins 27.

In operation, each time the wipers 5 and 6 of the trolley pole contact with the wipers 2 and $2^a$ of the trolley wire, or the wiper 8 contacts with the plate 15 the magnet 13 is energized, the sliding rod 14 is attracted by the magnet, the arm 17 and the pawl 20 operate the roller 26 and the canvas 29 is wrapped around the said roller and unrolled from the roller 28 for a distance sufficient to display the name of the next stopping place through the panel or window 32, or the roller 28 is operated by the arm 18 and pawl 21 to move the canvas band in an opposite direction. The selection of the roller to be operated is controlled by the lever 39, which is operated by the conductor at each termination of the route, or completion of the journey.

Spare surfaces on the canvas band 29 are utilized for displaying advertisements or the like.

The rollers 26 and 28 are checked in their rotation by friction rollers 40 mounted upon springs 41 and pressing into recesses 42 formed in disks 43 attached to the said rollers 26 and 28.

What I do claim and desire to secure by Letters Patent of the United States is:—

1. An indicator of the character described, comprising two rollers, a belt wound on the rollers, a sliding rod, arms pivotally carried by the rod and normally held inwardly, spring operated pawls carried by the ends of the arms, ratchets carried by the rollers and adapted to be engaged by the pawls, a sliding switch arranged between and moving transverse the arms, and means for sliding said switch whereby one arm is moved toward its roller and the other arm allowed to move away from its roller.

2. An indicator of the character described comprising two rollers, a belt wound on the rollers, a sliding rod, arms pivotally carried by the rod, and normally held inwardly, spring operated pawls carried by the ends of the arms, ratchets carried by the rollers and adapted to be engaged by the pawls, a sliding switch arranged between and moving transverse the arms, rollers carried by the switch and at all times engaged by the arms, and means for sliding said switch whereby one arm is moved toward its roller and the other arm allowed to move inwardly away from its roller.

3. An indicator of the character described, comprising two rollers, a belt wound on the rollers, a sliding rod, means for operating the rod at predetermined intervals, arms pivotally carried by the rod and normally held inwardly, spring operated pawls carried by the outer free ends of the arms, ratchets carried by the rollers and engaged by said pawls, a sliding switch arranged between the rollers, and moving transverse thereof, and a lever for sliding said switch whereby one arm is moved toward its roller and the other arm simultaneously allowed to move away from its roller.

In testimony whereof I have signed my name to this specification in the presence of one witness.

EDWARD ROSCOE.

Witness:
L. A. McCONNELL.

Copies of this patent may be obtained for five cents each, by addressing the "Commissioner of Patents, Washington, D. C."